United States Patent
Ward et al.

(10) Patent No.: US 8,613,131 B2
(45) Date of Patent: Dec. 24, 2013

(54) METHODS FOR FORMING A MAGNET IN A ROTOR

(75) Inventors: Terence G. Ward, Redondo Beach, CA (US); Khwaja M. Rahman, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 894 days.

(21) Appl. No.: 12/763,494

(22) Filed: Apr. 20, 2010

(65) Prior Publication Data

US 2010/0199489 A1 Aug. 12, 2010

Related U.S. Application Data

(62) Division of application No. 11/736,671, filed on Apr. 18, 2007, now Pat. No. 7,730,603.

(51) Int. Cl.
*H02K 15/02* (2006.01)
*H02K 15/10* (2006.01)

(52) U.S. Cl.
USPC .................. 29/598; 29/419.2; 29/596; 29/607

(58) Field of Classification Search
USPC ............. 29/598, 419.1, 419.2, 508, 596, 607, 29/608; 310/43, 44, 156.02, 156.18, 310/156.43, 156.49, 156.53, 261.1
See application file for complete search history.

(56) References Cited

U.S. PATENT DOCUMENTS

| | | | |
|---|---|---|---|
| 2,648,609 A | 8/1953 | Wurster | |
| 5,898,253 A * | 4/1999 | El-Antably et al. | 310/261.1 |
| 6,509,667 B1 | 1/2003 | El-Antably et al. | |
| 6,684,483 B2 | 2/2004 | Rahman et al. | |
| 7,051,421 B2 * | 5/2006 | Biais et al. | 29/596 |

FOREIGN PATENT DOCUMENTS

| | | |
|---|---|---|
| CN | 1179372 C | 12/2004 |
| CN | 1201463 C | 5/2005 |

OTHER PUBLICATIONS

Office Action mailed Apr. 14, 2010, for Chinese Patent Application 200810093343.1, filed Apr. 18, 2008.

* cited by examiner

*Primary Examiner* — Thiem Phan
(74) *Attorney, Agent, or Firm* — Ingrassia Fisher & Lorenz, P.C.

(57) ABSTRACT

Methods are provided for forming/inserting a magnet in a rotor. One method includes coating a plurality of magnetizable particles with a non-metallic material, inserting the coated particles in a rotor, and magnetizing the coated particles. Another method includes inserting a plurality of magnetizable particles into a rotor, submersing the rotor in motor varnish or another viscous, non-metallic material to coat the particles, and magnetizing the particles. Yet another method includes inserting a plurality of magnetizable particles in a rotor, inserting a non-metallic material into the rotor, mixing the particles and non-metallic material to form a mixture, curing the mixture to coat each particle with non-metallic material, and magnetizing the particles. Still another method includes mixing a plurality of magnetizable particles with a non-metallic material, curing the non-metallic material to coat each particle with non-metallic material, inserting the coated particles in a rotor, and magnetizing the coated particles.

13 Claims, 4 Drawing Sheets

METHODS FOR FORMING A MAGNET IN A ROTOR

CROSS-REFERENCES TO RELATED APPLICATIONS

This application is a division of U.S. application Ser. No. 11/736,671, filed on Apr. 18, 2007, which is incorporated herein by reference.

FIELD OF THE INVENTION

The present invention generally relates to electric motors, and more particularly relates to methods for forming magnets in motor rotors.

BACKGROUND OF THE INVENTION

Electric motors are commonly utilized to power electric devices within a vehicle (e.g., an automobile). FIG. 1 is a simplified diagram of a prior art electric motor 100 including an axle 140 around which a rotor 110 rotates, and also including brushes 154 and 158 connected to a power source 160 to provide power to rotor 110.

Generally, rotor 110 is surrounded by a field magnet 120 having a "north pole" 124 and a "south pole" 128 on opposite sides of rotor 110. Furthermore, rotor 110 typically includes a magnetic orientation (i.e., north pole and south pole) that changes at a pre-determined position when power is supplied to brushes 154 and 158. In this example, rotor 110 includes a magnetic orientation that changes as rotor 110 rotates such that a "north pole" is always above a horizontal position 130. The changing "north pole" of rotor 110 is attracted to south pole 128 and repelled by north pole 124, which in this example, results in a clockwise rotation around axle 140.

To create the magnetic properties of rotor 110, magnets are commonly bonded to the surface of rotor 110. However, it has been demonstrated that it is desirable to include one or more magnets embedded within a rotor. Accordingly, it is desirable to provide methods for forming one or more magnets within a rotor. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Various exemplary embodiments of the invention provide methods for forming a magnet in a rotor. One embodiment includes inserting a plurality of magnetizable particles in a rotor, coating the particles with a non-metallic material, and magnetizing the particles. Another embodiment includes inserting a plurality of magnetizable particles into a rotor, submersing the rotor in motor varnish or another viscous, non-metallic material to coat the particles, and magnetizing the particles. Yet another embodiment includes inserting a plurality of magnetizable particles in a rotor, inserting a non-metallic material into the rotor, mixing the particles and non-metallic material to form a mixture, curing the mixture such that each magnetizable particle is coated with non-metallic material, and magnetizing the coated particles. Still another embodiment includes mixing a plurality of magnetizable particles with a non-metallic material to form a mixture, inserting the mixture in a rotor, curing the mixture to coat each particle with non-metallic material, and magnetizing the coated particles.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
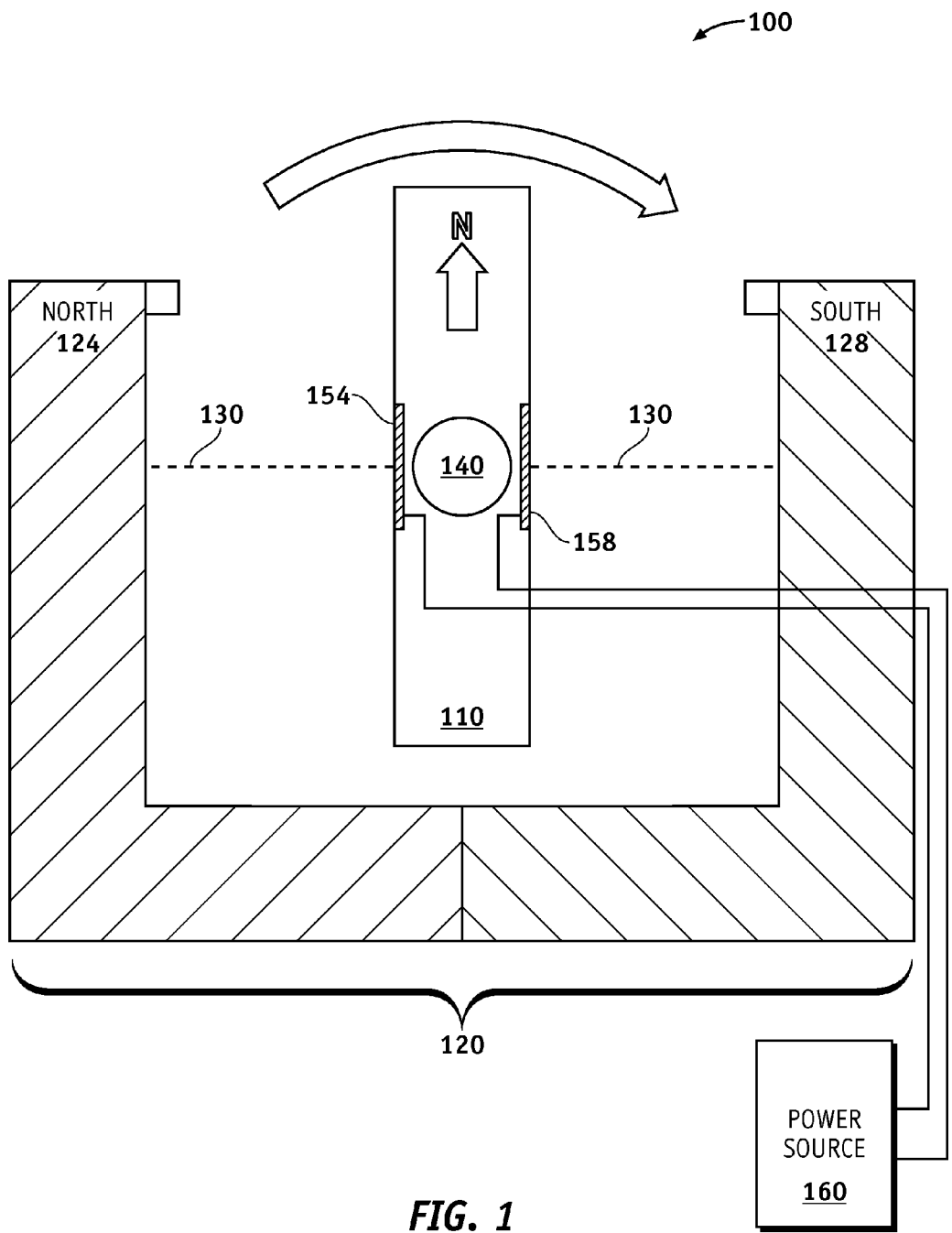
FIG. 1 is a diagram representing a prior art electric motor.
Figure 2A:
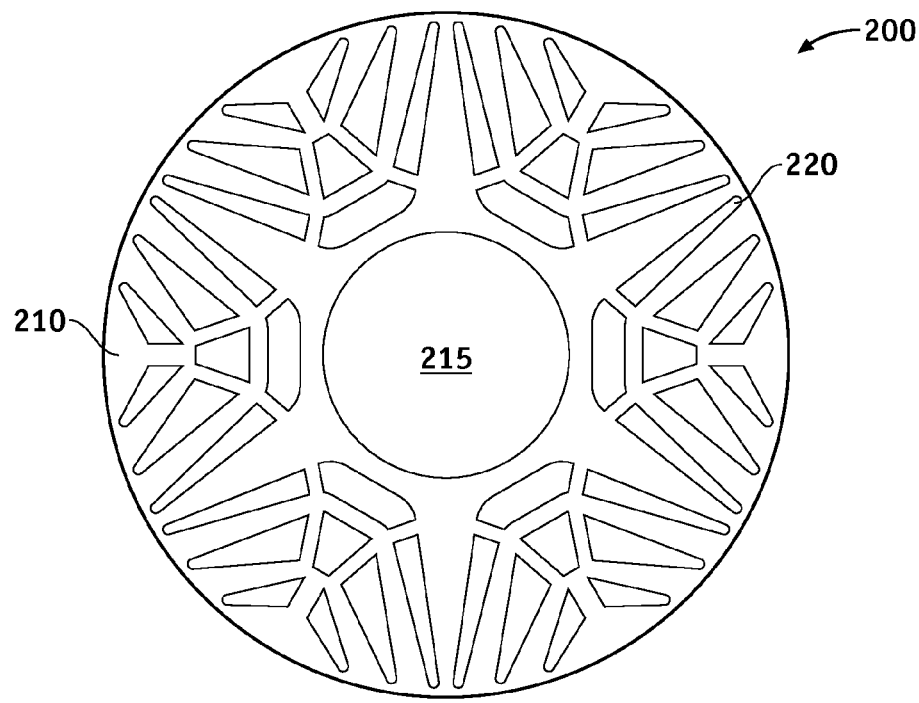
FIGS. 2A and 2B are top views of a diagram of one exemplary embodiment of a rotor during formation of at least one magnet embedded within the rotor.

FIG. 2A is a top view of a diagram of one exemplary embodiment of a rotor 200 during formation of a magnet (shown in FIG. 3) embedded within rotor 200. Rotor 200 includes a main portion 210 including an aperture 215 for receiving an axle (not shown) and one or more apertures 220 within which a magnet is embedded and/or formed.

Each aperture 220 is shaped such that the magnetic orientation of rotor 200 changes as rotor 200 rotates around the axle. In doing such, each aperture 220 is configured to house a magnet, particles of a magnetizable material (e.g., neodymium-iron-boron, ferrite, and samarium-cobalt, and the like materials), and/or a mixture of magnetizable particles and a non-metallic material (e.g., an adhesive, a polyurethane material, an epoxy, a B-staged adhesive, motor varnish, and the like) that extends either completely through or partially through main portion 210. In addition, each aperture 220 is configured to enable any magnetizable particles and/or mixtures including magnetizable particles to be magnetized when contained within aperture(s) 220.

Figure 2B:
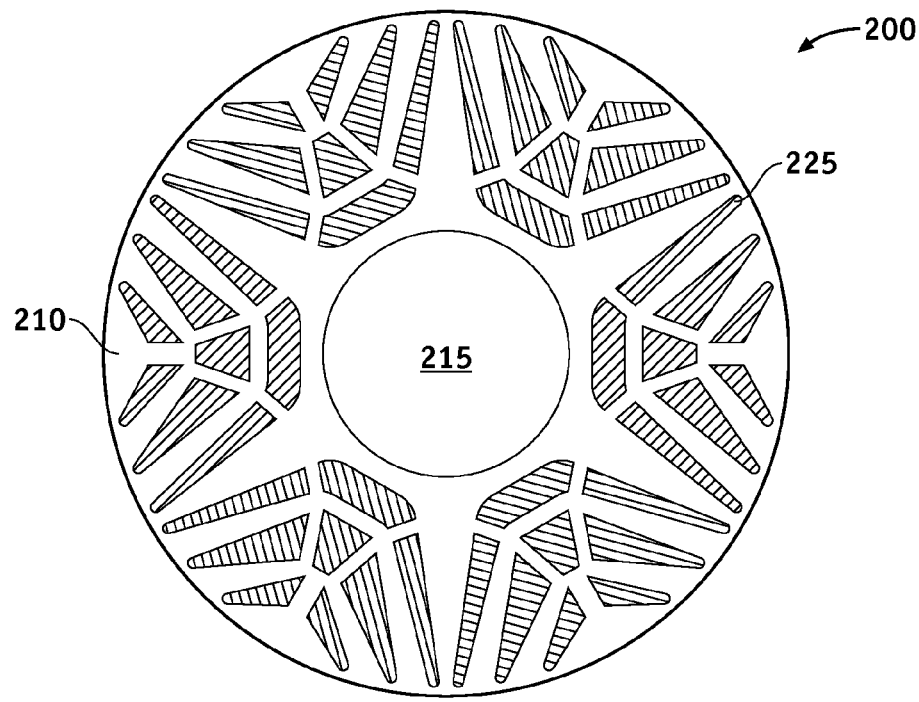

FIG. 2B is a diagram of rotor 200 including magnets 225 formed of magnetized particles coated with non-metallic material substantially filling each aperture 220. Magnet(s) 225 are formed by coating the magnetizable particles with non-metallic material and magnetizing the particles, which coating and/or magnetizing may be performed either outside of or within aperture(s) 220.

After coating, the non-metallic material may be treated (e.g., cured and/or evacuated) so that the particles are more uniformly coated and/or to ensure each particle is separated from its neighboring particle(s) by the non-metallic material. Accordingly, the non-metallic material should be strong enough to resist particle migration caused by the attraction/repulsion of the particles to one another.

In addition, when the particles, either alone or within a mixture, are magnetized, the polarity of each particle is oriented in substantially the same direction with respect to one another. For example, each north pole and south pole of each magnetized particle is "pointed" in substantially the same direction.

When magnet(s) 225 are formed outside of aperture(s) 220, each magnet 225 is subsequently inserted into a respective aperture 220. Accordingly, the dimensions of each magnet 225 should be slightly smaller than the dimensions of its corresponding aperture 220 to account for the needed clearance space. This is not the case when a magnet 225 is formed within an aperture 220 since the particles and non-metallic material may be individually inserted (e.g., manually, injection molded, etc.), mixed/coated, cured, and/or magnetized within each aperture 220.

Figure 3:
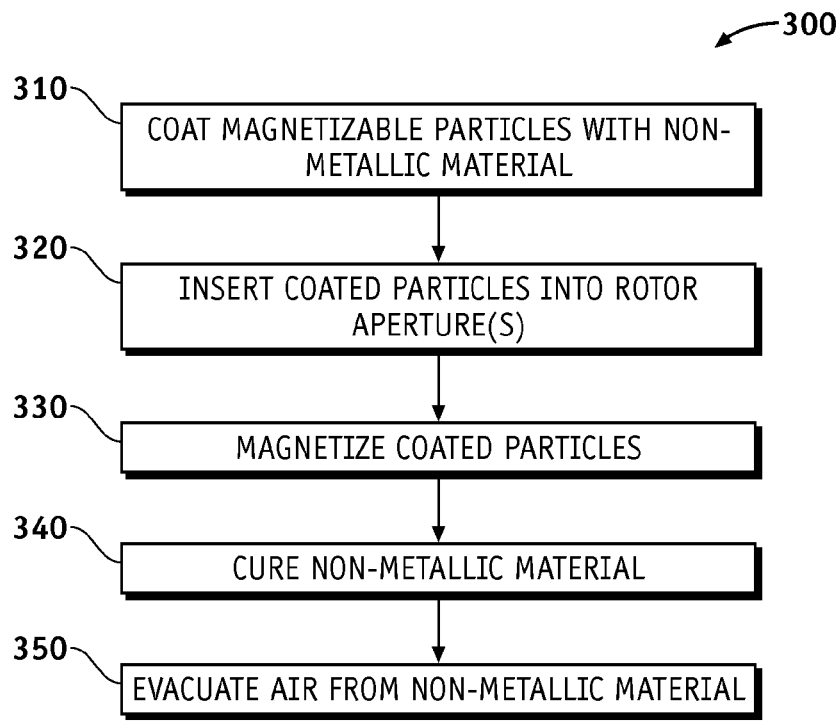
FIG. 3 is a flow diagram representing one exemplary embodiment of a method for forming a magnet within a rotor.

FIG. 3 is a flow diagram representing one exemplary embodiment of a method 300 for forming a magnet (e.g., magnet 225) embedded within a rotor (e.g., rotor 200). Method 300 begins by coating particles of a magnetizable material (e.g., neodymium-iron-boron, ferrite, and samarium-cobalt, and the like materials) having a size in the range of about 20 microns to about 1000 microns with a non-metallic material (e.g., an adhesive (e.g., a B-staged adhesive), a polyurethane material, an epoxy, motor varnish, and the like) (step 310). Examples of coating methods include, but are not limited to, spraying the non-metallic material on the particles, attracting the non-metallic material to the particles by electrostatic processes, combining the particles with a liquid/semi-liquid pool of non-metallic material, and/or other methods capable of coating a magnetizable material with a non-metallic material.

The coated particles are inserted/embedded (e.g., manually, utilizing injection molding techniques, etc.) into at least one aperture (e.g., aperture 220) of rotor 200 (step 320) and magnetized to form coated magnetized particles (step 330). In magnetizing the coated particles, the north pole and south pole of each particle are oriented in substantially the same direction.

The coated particles may be magnetized before and/or after insertion into aperture(s) 220. Moreover, the particles may be coated with non-metallic material after insertion into aperture(s) 220.

To more uniformly coat the particles and/or to ensure that the particles are not in contact with one another, the non-metallic material may be cured (step 340). Examples of methods to cure the coated particles include, but are not limited to, heat treating the coated particles to the melting point of the non-metallic material, solvent curing, catalyst curing, and/or other methods capable of more uniformly coating the particles and/or ensuring that the particles are not in contact with one another. In addition, air may be evacuated from the non-metallic material utilizing, for example, vacuum techniques or other processes capable of removing air from a liquid or semi-liquid material (step 350).

Although the steps of method 300 have been described in a particular order, the invention is not limited to such order. That is, steps 310 through 350 may occur in any order. Moreover, any one of steps 310 through 350 may be repeated multiple times.

Figure 4:
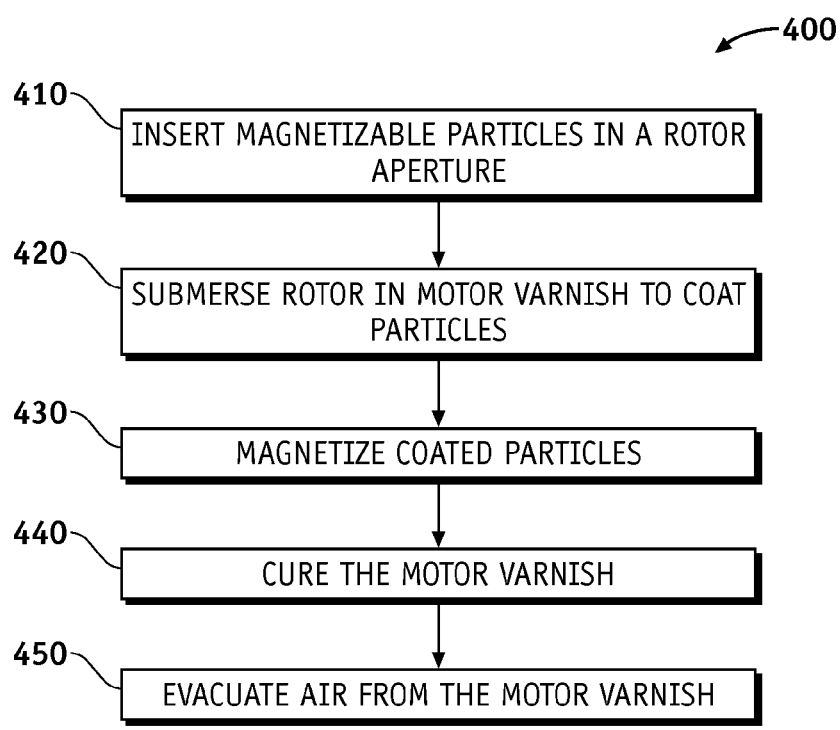
FIG. 4 is a flow diagram representing another exemplary embodiment of a method for forming a magnet embedded within a rotor.

FIG. 4 is a flow diagram representing another exemplary embodiment of a method 400 for forming a magnet (e.g., magnet 225) in a rotor (e.g., rotor 200). Method 400 begins by inserting (e.g., manually, injection molding, etc.) particles having a size in the range of about 20 microns to about 1000 microns of a magnetic material (e.g., neodymium-iron-boron, ferrite, and samarium-cobalt, and the like materials) into an aperture (e.g., aperture 220) of rotor 200 (step 410).

With the particles in aperture 220, rotor 200 is submersed ("dipped") in motor varnish to coat the particles with motor varnish (step 420). The coated particles are then magnetized while housed within aperture 220 (step 430). The north and south poles of each particle are oriented in substantially the same direction when the coated particles are magnetized.

Method 400 also includes curing (e.g., vacuum curing) the coated particles to more uniformly coat the particles and/or to ensure that the particles are separated from one another by the motor varnish (step 440). The coated particles may be cured either before and/or after the magnetizing step (i.e., step 430). Moreover, although method 400 describes coating the particles with motor varnish, the invention contemplates that the particles may be coated with any viscous, non-metallic material capable of coating the particles such that, when coated, the particles are not in direct contact with one another.

Figure 5:
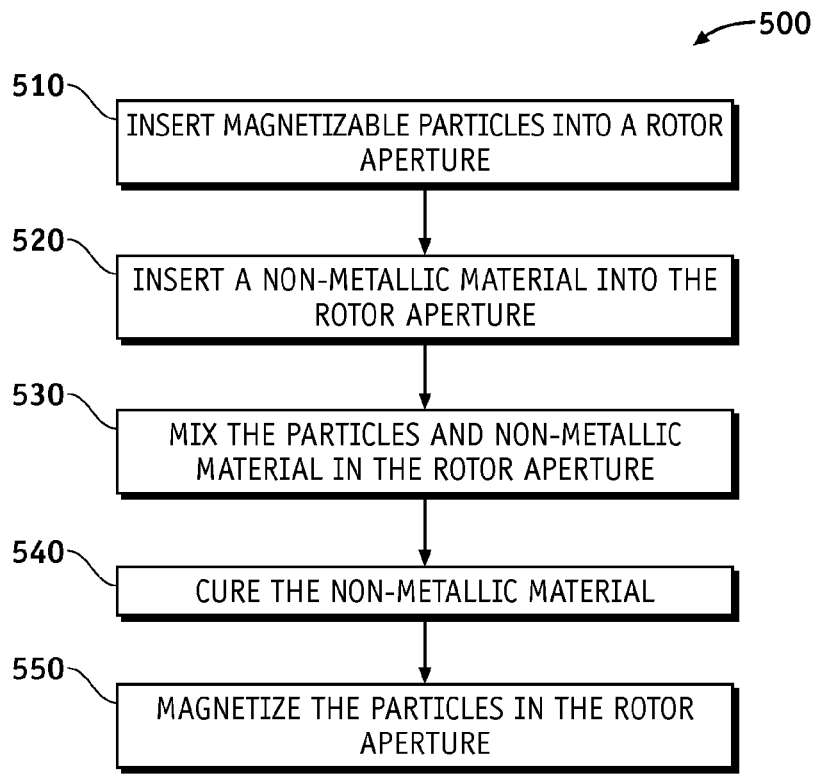
FIG. 5 is a flow diagram representing yet another exemplary embodiment of a method for forming a magnet within a rotor.

FIG. 5 is a flow diagram representing yet another exemplary embodiment of a method 500 for forming a magnet (e.g., magnet 225) within a rotor (e.g., rotor 200). Method 500 begins by inserting (e.g., manually, injection molding, etc.) particles having a size in the range of about 20 microns to about 1000 microns of a magnetic material (e.g., neodymium-iron-boron, ferrite, and samarium-cobalt, and the like materials) into an aperture (e.g., aperture 220) of rotor 200 (step 510). A non-metallic material (e.g., an adhesive (e.g., a B-staged adhesive), a polyurethane material, an epoxy, motor varnish, and the like) is also inserted (e.g., manually, injection molding, etc.) into aperture 220 (step 520).

The particles and non-metallic material is mixed in aperture 220 to form a mixture of at least partially coated particles (step 530), and the mixture is cured (e.g., heat curing, solvent curing, catalyst curing, etc.) to separate the particles from one another and/or to coat the particles with non-metallic material (step 540). The partially coated and/or coated particles are then magnetized in aperture 220 (step 550).

Figure 6:
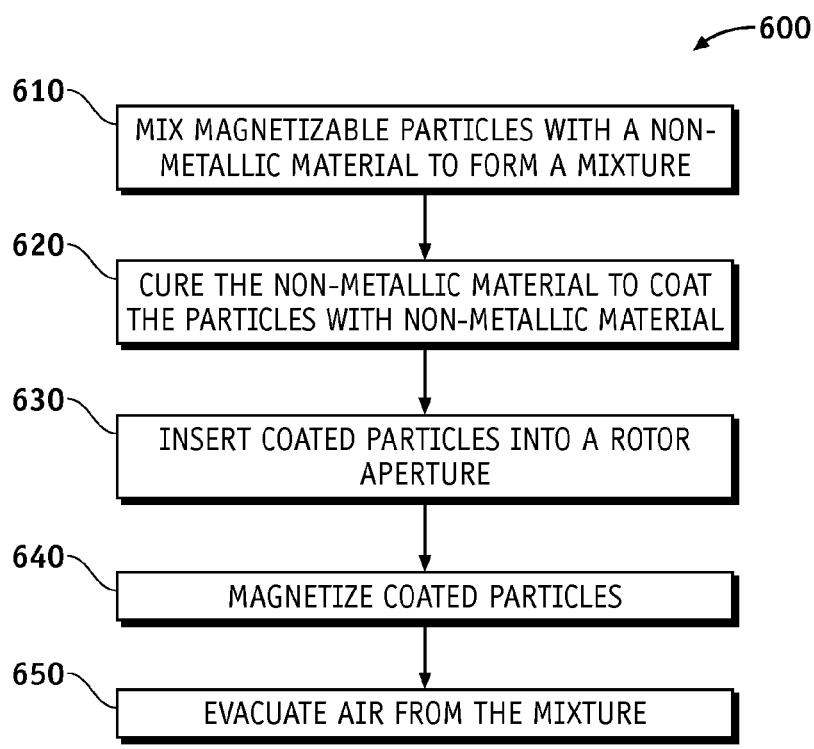
FIG. 6 is a flow diagram representing still another exemplary embodiment of a method for forming a magnet within a rotor.

FIG. 6 is a flow diagram representing still another exemplary embodiment of a method 600 for forming a magnet (e.g., magnet 225) within a rotor (e.g., rotor 200). To begin, method 600 includes mixing particles having a size in the range of about 20 microns to about 1000 microns of a magnetic material (e.g., neodymium-iron-boron, ferrite, and samarium-cobalt, and the like materials) with a non-metallic material (e.g., an adhesive (e.g., a B-staged adhesive), a polyurethane material, an epoxy, motor varnish, and the like) is also inserted (e.g., manually, injection molding, etc.) (step 610).

The non-metallic material is then cured (e.g., heat curing, solvent curing, catalyst curing, etc.) to coat each particle with non-metallic material (step 620).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

We claim:
1. A method for forming a magnet in a rotor having at least one aperture, the method comprising the steps of:
   inserting a plurality of particles of a magnetizable material into the aperture;

submersing the rotor in motor varnish to coat the particles with the motor varnish; and magnetizing the plurality of coated particles.

2. The method of claim 1, further comprising the step of vacuum curing the motor varnish to more uniformly coat the particles.

3. The method of claim 1, wherein the insertion step comprises the step of injection molding the particles into the aperture.

4. The method of claim 1, wherein the step of magnetizing the coated particles comprises the step of magnetizing the coated particles while the coated particles are in the aperture.

5. The method of claim 1, wherein each of the plurality of particles has a size approximately between twenty microns and one thousand microns.

6. A method for forming a magnet in a rotor having at least one aperture, the method comprising the steps of:

inserting a plurality of particles of a magnetizable material into the aperture;

submersing the rotor in a viscous, non-metallic material; and magnetizing the plurality of particles.

7. The method of claim 6, wherein the viscous, non-metallic material comprises a motor varnish.

8. The method of claim 6, further comprising the step of: evacuating air from the viscous, non-metallic material.

9. The method of claim 6, further comprising the step of: vacuum curing the viscous, non-metallic material.

10. The method of claim 6, wherein the insertion step comprises the step of injection molding the particles into the aperture.

11. The method of claim 6, wherein the step of submersing the rotor comprises the step of submersing the rotor in the viscous, non-metallic material while the plurality of particles are in the aperture.

12. The method of claim 6, wherein the step of magnetizing the plurality of particles comprises the step of magnetizing the plurality of particles while the plurality of particles are in the aperture.

13. The method of claim 6, wherein each of the plurality of particles has a size approximately between twenty microns and one thousand microns.

\* \* \* \* \*